United States Patent [19]

Fontaine et al.

[11] 4,142,618

[45] Mar. 6, 1979

[54] RESILIENT SELF-ALIGNING CLUTCH RELEASE BEARING

[75] Inventors: Georges Fontaine, Alfortville; Francis Regazzoni, Paris; Claude Serville, Clamart; René Vinel, Bourg-la-Reine, all of France

[73] Assignee: SKF Compagnie d'Applications Mechaniques, Clamart, France

[21] Appl. No.: 702,668

[22] Filed: Jul. 6, 1976

[30] Foreign Application Priority Data

Jul. 8, 1975 [FR] France ................................. 75 21447
Jul. 8, 1975 [FR] France ................................. 75 21451
Jul. 8, 1975 [FR] France ................................. 75 21452

[51] Int. Cl.² ....................... F16C 33/30; F16D 23/14
[52] U.S. Cl. ..................................... 192/98; 308/236
[58] Field of Search ............... 192/98, 110 B; 308/233, 308/236

[56] References Cited

U.S. PATENT DOCUMENTS

| 2,837,382 | 6/1958 | Schaefer | 308/236 |
| 3,631,954 | 10/1969 | Coaley | 192/98 |
| 3,805,934 | 4/1974 | Labadie | 192/98 |
| 3,815,715 | 6/1974 | Maucher | 192/98 |
| 3,904,008 | 9/1975 | Sonnerat | 192/98 |
| 3,921,775 | 11/1975 | Matyschik | 192/98 |
| 3,967,710 | 7/1976 | Ernst et al. | 192/98 |

Primary Examiner—Benjamin W. Wyche
Attorney, Agent, or Firm—Owen, Wickersham & Erickson

[57] ABSTRACT

A clutch release bearing having thin-walled inner and outer races. To the inner surface of the inner race is secured a sleeve of resilient material. This sleeve may have a plurality of ribs in contact with the tube guide of the gear box. A single blind annular recess or plurality of substantially axial full length or blind recesses is disposed in the thickness of each sleeve, substantially in the area of each rib. Self-alignment of the release bearing is obtained by deformation of the walls between the ribs and the recesses or by radial compression of the ribs or both. The ribs may be substantially radially inclined and preferably there are at least six such ribs. Alternatively, the sleeve has an inner cylindrical portion, either unitary or axially split, in contact with the tube guide.

26 Claims, 25 Drawing Figures

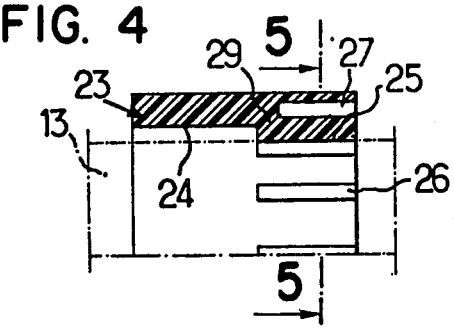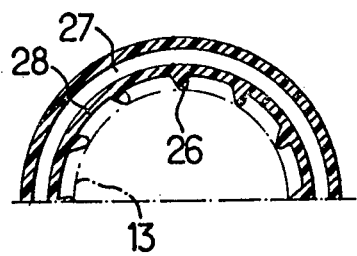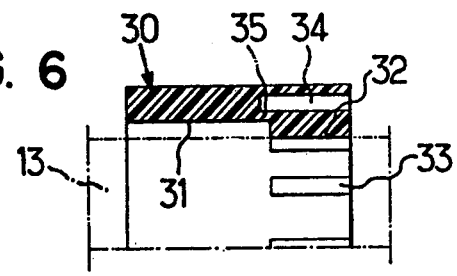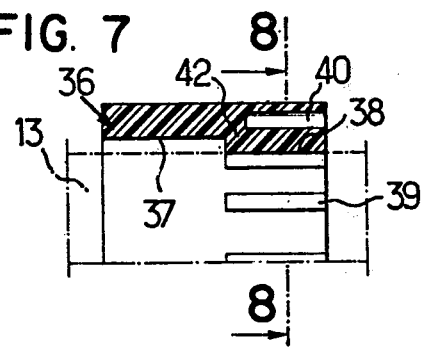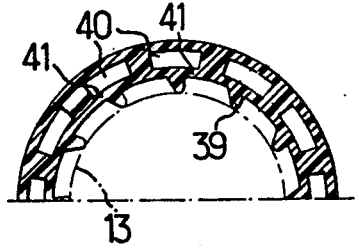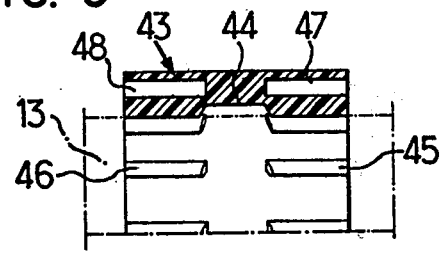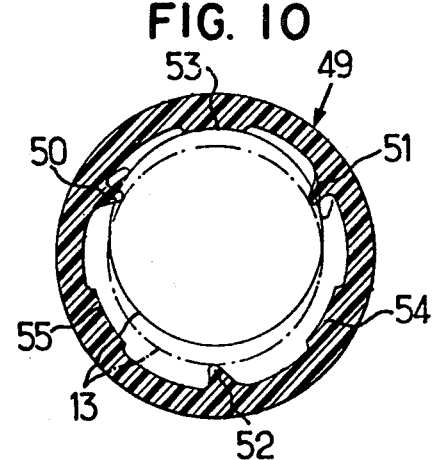

RESILIENT SELF-ALIGNING CLUTCH RELEASE BEARING

BACKGROUND OF THE INVENTION

The present invention relates to a self-aligning resilient clutch release bearing for disc clutches and, more particularly, for diaphragm clutches, said release bearing comprising an anti-friction bearing, for example a ball bearing, one of the races of which is provided with a resilient sleeve enabling axial sliding and also permitting radial and angular movement of the other race in contact with the diaphragm for its alignment during each disengagement of the clutch.

It is known that this type of clutch release bearing comprising a ball bearing or the like should preferably be provided with a resilient device permitting a certain movement of the release bearing in relation to the shaft of the gear box of the vehicle, or in relation to the guide tube on which the release bearing moves. It is in fact known that one of the two races of the ball bearing of such a release bearing which transmits the clutch disengagement stress, comes into direct supporting contact with the diaphragm or remains in continuous contact with the latter, while the other race receives the thrust of the clutch disengagement fork. The race coming into contact, or remaining in contact, with the diaphragm, for example the inner race of the bearing, has a substantially toric supporting surface, the release bearing being neither exactly centered on the shaft of the gear box nor exactly aligned in relation to the axis of rotation of the diaphragm. Besides, the geometric axis of the diaphragm of the clutch, its axis of rotation, and the axis of the shaft of the gear box or of the tube guide do not always coincide exactly, which makes it all the more necessary to provide a possibility for the release bearing to move at the moment of each clutch disengagement.

To cure these disadvantages, an antifriction lining may be provided either on the race or on the diaphragm or on the two members in mutual contact, so as to reduce friction and wear and tear of said members which are off-center in relation to each other during each clutch disengagement operation.

It is also known to provide clutch release bearings comprising means for insuring their automatic alignment during each clutch release. In release bearings of this type, elastic elements of various forms are interposed between one of the races of the ball bearing and the tube guide, or between the latter and a sliding socket which moves in relation to the tube guide or in relation to the shaft of the gear box. However, until now the structure of the elastic elements thus interposed has not made it possible to obtain correct functioning, that is, an automatic alignment during each clutch disengagement operation. It is in fact essential that the structure of these elastic elements be such that the latter be able to move radially and to pivot under the action of a relatively weak force deriving from the reaction of the bearing of the release bearing on the clutch diaphragm. Further, it is also necessary that the flexibility of said elastic elements be not too great, so as to insure correct functioning of the device and correct retention of the release bearing in engaged clutch position.

In U.S. Pat. No. 3,631,954 a clutch release bearing has already been provided in which a sliding socket integral with the inner race of the ball bearing moves on the tube guide through the intermediary of one or several toric joints of resilient material. Other structures of resilient elements are, for example, of the type shown in U.S. Pat. No. 3,805,934 where the interior ball race is integral with a cylindrical sleeve of resilient material, said race having thin walls obtained by stamping from a metal sheet or a tube. In relation to the preceding embodiment, this latter embodiment has the advantage of greater simplicity of manufacture, taking into account the thin-walled structure of the interior race of the bearing and the possibility of molding the resilient sleeve onto the interior race. It is, however, noted that the results obtained from such a structure are unsatisfactory.

Clutch release bearings are also known in which a resilient element with discontinuous contact is interposed between one of the races of the ball bearing and a socket capable of sliding in relation to the tube guide. A U.S. Pat. No. 3,625,327 shows such an arrangement in which the sliding socket is connected to a ball bearing with massive races through the intermediary of a plurality of individual radial nipples working at the compression. Such a structure is complex and does not permit correct functioning. In French Pat. No. 73 43651 and U.S. Pat. No. 3,921,775, one again finds a substantially analogous device in which a ring of plastic material having projections oriented obliquely in relation to the axis and interposed between one of the races of the ball bearing and a sliding socket.

In this last embodiment, the massive ring of the bearing is further in frictional contact with a radial surface of the sliding socket, which hinders considerably the desired self-alignment. Further, this arrangement has the same complexity as the preceding one.

The object of the present invention is to cure these disadvantages and to provide a clutch release bearing which insures automatic alignment at each clutch disengagement operation in a simple manner, thanks to an easily manufactured structure enabling convenient adjustment of the flexibility of the unit. The present invention also aims at a resiliently self-aligning clutch release bearing comprising a thin-walled ball bearing provided with a resiliently centering sleeve of particular structure having at once the rigidity and the flexibility necessary for correct functioning and repeated by the bearing during functioning of the clutch engagement of the vehicle.

SUMMARY OF THE INVENTION

The resiliently self-aligning clutch release bearing of the invention comprises a ball bearing or other anti-friction bearing (e.g., needle bearing, roller bearing, or tapered roller bearing) or the like provided with interior and exterior thin-walled races or rings, such as may be obtained by stamping from a sheet or a tube, the inner race or ring being capable of sliding directly on a tube guide through the intermediary of a sleeve of resilient material, said sliding being obtained under the action of the thrust of the clutch disengagement fork.

In accordance with some forms of the invention, the sleeve of resilient material has along its internal surface a plurality of radial ribs extending parallel to the axis of the bearing, the shape of each of said ribs narrowing toward the interior, so as to enhance deformation of said ribs during each clutch-engaging operation, by simultaneously compressing the material in the radial direction and bending it in the tangential direction.

In a preferred embodiment of this form of the invention, the ribs are inclined in relation to the radial direction, preferably in the direction of rotation of the bearing, so as to increase their flexibility.

In another preferred embodiment of this form of the invention, the sleeve of resilient material has in its central part a cylindrical recess occupying at least about one-third of the total length of the sleeve and free of ribs in contact with the tube guide.

In accordance with many forms of the invention, whether there are ribs or not, the sleeve of the bearing has one or more substantially axially-extending recesses. Thus, the sleeve may come into contact with the outer surface of the tube guide through the intermediary of inner ribs projecting radially inwardly and extending parallel to the axis of the bearing, each rib being disposed substantially in the region of a recess so as to transmit the compression stress and enhance deformation of the inner wall of the recess during each clutch disengagement operation, thus insuring the self-alignment of the bearing.

If there is a single annular recess, it is blind. If there are several recesses, they are circumferentially disposed and may extend over the entire axial length of the sleeve, which they traverse from end to end.

The use of a recess or recesses increases the flexibility of the resilient sleeve, the inner walls of the recesses becoming deformed outwardly under the action of the ribs. In some embodiments, the axial depth of such recess or recesses is shorter than the length of the ribs, so as to preserve an annular zone working in compression. In other embodiments wherein flexibility is further increased, the axial depth of the groove or of the recesses is greater than the length of the ribs, so that the resilient sleeve has an annular zone likely to bend during a clutch disengagement operation.

The choice of the number of radial ribs, where they are used, is determined partly by the hardness of the resilient material used. It has, however, been found that excellent results can be obtained by providing at least six ribs, and preferably twenty-four ribs, the resilient material having a Shore hardness of about 50. It will, however, be understood that in effect three radial ribs will suffice for insuring automatic alignment of the clutch bearing during clutch engagement, so long as means are provided for preventing the tube guide from remaining jammed between these three ribs after a clutch disengagement operation. Thus, it is possible to provide, for safety's sake, in such a construction having a small number of active ribs, particularly where there are fewer than six, an equal number of supplementary ribs playing the role of bearings, which normally do not enter into contact with the tube guide, these supplementary ribs being interposed between the above-recited active ribs.

In some embodiment, each rib is split over its entire length in contact with the tube guide by an axial groove communicating with a corresponding recess.

The shape of the ribs may be preferably chosen so that they also are deformed by compression as well as by bending.

In other embodiments, the sleeve may have an internal central or lateral cylindrical portion free of ribs in contact with the tube guide, and of an internal diameter greater than the exterior diameter of the tube guide, so as not to come into contact with the latter. In these embodiments, the recesses may be blind. Depending on the desired rigidity, and particularly depending on the choice of the resilient material for the sleeve, one can contemplate choosing the total axial length of the ribs in contact with the tube guide either less than or greater than the axial depth of the blind recesses.

In accordance with other forms of the invention, the sleeve of resilient material has a cylindrical inner portion, often unribbed, shorter than the total length of the sleeve and coming into contact with the outer surface of the tube guide. The sleeve is then completed by a second cylindrical inner portion whose inner diameter is greater than the outer diameter of the tube guide, so that this latter inner portion does not come into contact with the tube guide. An annular groove or recess is provided in the sleeve, substantially in the area of the inner portion in contact with the tube guide, so as to enable deformation of this portion of the sleeve during each clutch disengagement operation.

Depending on the rigidity desired for the release bearing unit, the length of the inner cylindrical portion in contact with the outer surface of the tube guide may be selected to be shorter or longer than the axial depth of the annular groove.

In a preferred embodiment of this form of the invention and with a view to increasing the flexibility of the release bearing, the inner portion of the sleeve in contact with the outer surface of the tube guide may be divided into a plurality of substantially axially-extending strips capable of being forced outwardly into the annular groove during each clutch-disengaging operation, thus causing pivoting of the release bearing. In one embodiment, the strips may also have or be inner ribs, projecting radially and oriented parallel to the axis of the release bearing, so that contact of the sleeve with the tube guide is established through the intermediary of these ribs.

The resilient sleeve of the invention may be of a structure symmetrical in relation to a plane perpendicular to the axis of the release bearing, in which case the sleeve has two cylindrical inner portions in contact with the tube guide and two corresponding annular grooves.

BRIEF DESCRIPTION OF THE DRAWINGS

The present invention will be better understood upon study of several embodiments described by way of non-limiting examples and illustrated in the drawings, in which:

FIG. 4 is a schematic elevation in partial section, showing a sleeve of resilient material according to another embodiment of the invention, FIG. 5 is a partial section along the line 5—5 of FIG. 4, FIG. 6 is a view analogous to FIG. 4 but illustrating a modification in the structure of the sleeve, FIG. 7 is a view analogous to FIG. 4 showing another sleeve of resilient material in accordance with another embodiment of the invention, FIG. 8 is a partial section along the line 8—8 of FIG. 7, FIG. 9 is a view analogous to FIG. 4 showing yet another resilient sleeve, FIG. 10 is a sectional view along a plane perpendicular to the axis of a sleeve and comprising only three active ribs.

DESCRIPTION OF SOME PREFERRED EMBODIMENTS

Figure 1:
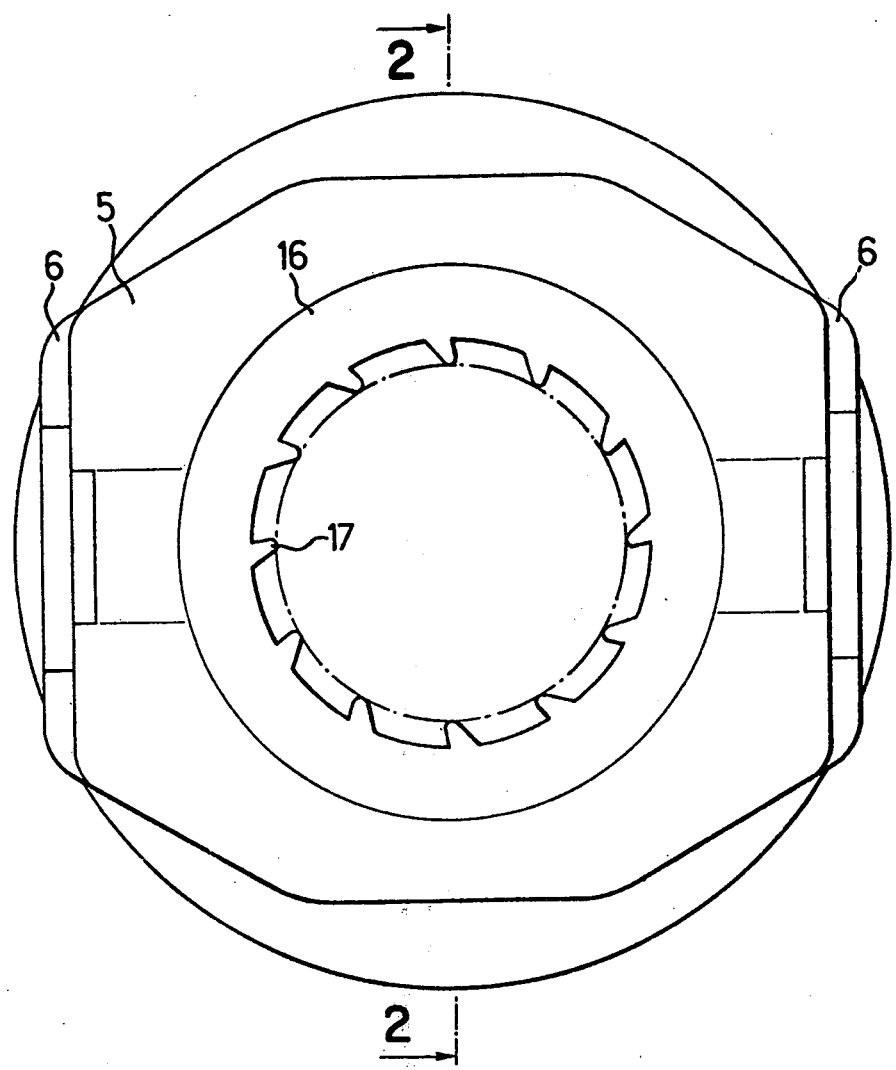
FIG. 1 shows a front view of a self-aligning clutch release bearing in accordance with the invention.
Figure 2:
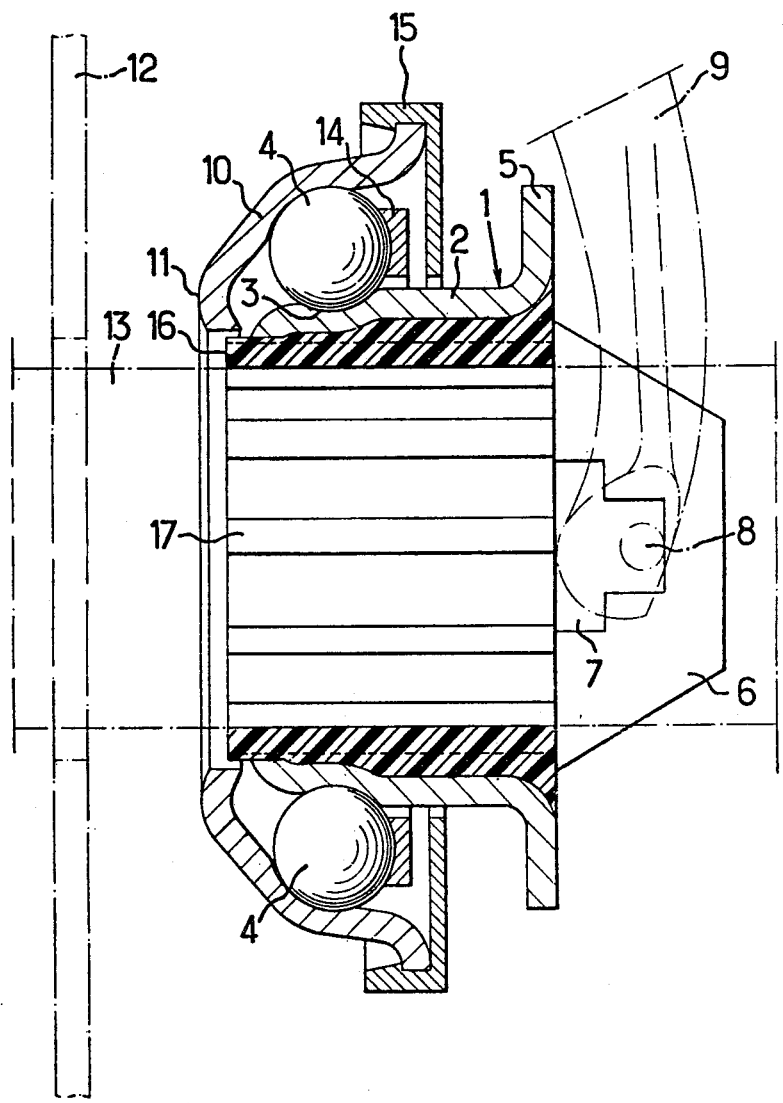
FIG. 2 is a section along the line 2—2 of FIG. 1.

The clutch release bearing illustrated in FIGS. 1 and 2 comprises a thin-walled interior rolling ring or inner race 1 formed from a metal sheet or tube having a tubular portion 2 and a toric rolling path or ball raceway 3 for a row of balls 4. Ball bearings are illustrated, but roller or needle bearings are understood to be included in the invention. In this embodiment, the tubular portion 2 is exteriorly prolonged by a radial collar 5 which, in turn, is laterally prolonged by two lugs 6 parallel to the axis of the release bearing. Each lug 6 has a recess 7 which cooperates with a locking pin 8 of the control fork 9, these elements being shown in broken lines in FIG. 2. It will, of course, be well understood that other means for securing the clutch fork 9 may be contemplated.

The ball bearing of the clutch release bearing is completed by an exterior ring or outer race 10, also having a thin wall formed by shaping a metal sheet or a tube. The outer race 10 comprises a toric portion 11 which may come into contact with the surface of the diaphragm 12 (shown in broken lines in FIG. 2) when the clutch fork 9 has induced a longitudinal movement of the release bearing in relation to the tube guide 13 (shown in broken lines in FIG. 2) and inside which the shaft of the gear box revolves. The balls 4 are held by a cage 14, the bearing being protected by a cover 15.

In accordance with the invention, a sleeve of resilient material 16 is secured by any appropriate means, for example by molding, on the inner surface of the inner race 1, thus covering the latter over its entire width. The inner surface of the resilient sleeve 16 has a plurality of ribs 17 disposed substantially radially but being inclined in relation to the radial direction, as may be seen in FIG. 1, so as to favor deformation of said ribs by flexing in a substantially tangential direction during the self-alignment of the release bearing at the moment of clutch disengagement.

The shape of the ribs 17 as seen in FIG. 1 is such that their width diminishes toward the interior, so as to improve their flexibility. Contact between the ribs 17 and the tube guide 13 is, in fact, established along a portion which is narrowed in relation to the widened base of the ribs 17.

The number of ribs 17 illustrated in the FIG. 1 embodiment is twelve. It will be well understood that a different number of ribs may be used so long as any jamming of the tube guide 13 is prevented when the release bearing is in released position.

During a clutch-release operation controlled by the clutch pedal of the vehicle, the fork 9 induces pressure on the inner race 1 of the ball bearing of the release bearing of the invention. The latter then slides on the tube guide 13, this sliding movement occurring directly through the intermediary action of the ribs 17 of the resilient sleeve 16, whose inner ends are in frictional contact with the outer surface of the tube guide 13. When the stress is transmitted by the toric portion 11 of the outer race 10, in contact with the diaphragm 12, the ribs 17 may be deformed by compression in substantially the radial direction, and, at the same time, by flexing or bending in substantially the tangential direction in relation to the tube guide 13, thus insuring correct automatic alignment of the axis of the clutch release bearing in relation to the axis of the diaphragm 12.

Figure 3:
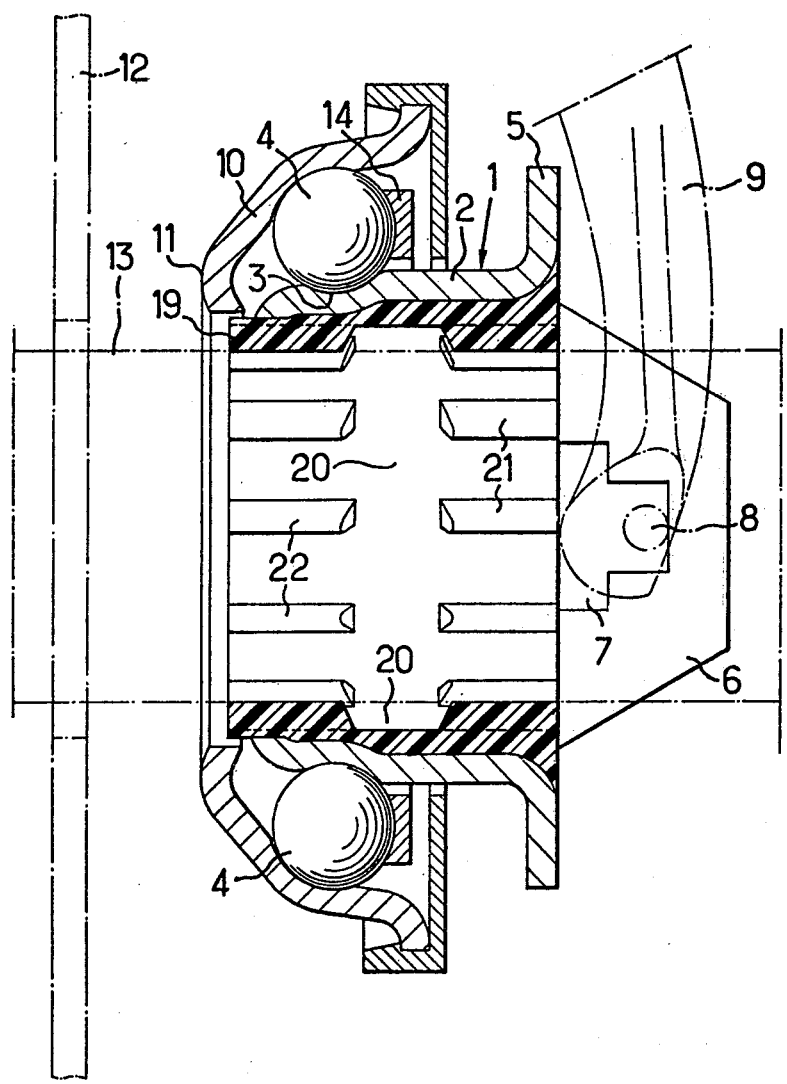
FIG. 3 is a sectional elevational view analogous to FIG. 2, showing another embodiment.

The embodiment illustrated in FIG. 3 is a modification of the release bearing shown in FIG. 2. In this embodiment, wherein all analogous members are designated by the same reference numerals, a resilient sleeve 19 is also secured by any suitable means, for example by molding, on the inner surface of the inner race 1. The resilient sleeve 19 has in its central portion a cylindrical recess 20 in the region of which the resilient sleeve 19 is not in contact with the tube guide 13. The length of the cylindrical recess 20 is substantially equal, as may be seen in FIG. 3, to one-third of the total length of the resilient sleeve 19, though it may be of advantage, with a view to improving the flexibility of the unit, to lengthen the recess 20. On both sides of the central recess 20, the peripheral surface of the resilient sleeve 19 has a plurality of substantially radial ribs 21 and 22 of a structure analogous to that of the ribs 17 of the embodiment shown in FIGS. 1 and 2. The ribs 21 and 22 thus have an inclination and a shape analogous to those shown in FIG. 1. This embodiment makes it possible to increase, with the same number of ribs, the flexibility of the resilient sleeve 19 in relation to the embodiment of FIG. 2.

FIGS. 4 to 10 are more schematic representations than the preceding figures, they show only different embodiments of the resilient sleeve which is interposed, in accordance with the present invention, between the inner race of the bearing and the tube guide. For simplification, in most instances only half of the sleeve has been shown, and its shape has been stylized by preserving only its essential characteristics. It will, however, be understood that in reality the general form of these sleeves of resilient material will be somewhat different and will in particular be adapted to the inner surface of the inner race of the bearing so as to permit affixing, for example, by molding.

FIGS. 4 and 5 shown in section, in elevation and in frontal section, respectively, a resilient sleeve 23 which comprises an inner cylindrical portion 24, shorter than the total length of the sleeve 23; this inner cylindrical portion 24 is free from ribs in contact with the tube guide, and its inner diameter is such that it does not engage the outer surface of the tube guide 13. The sleeve 23 has another inner portion 25 which is equipped with substantially radial ribs 26 of a structure analogous to that of the ribs 17 of the embodiment shown in FIGS. 1 and 2. The ribs 26 thus have an inclination and a shape analogous to those shown in FIG. 1, as may be seen in reviewing FIG. 1, where it is seen that their narrowed ends come into contact with the outer surface of the tube guide 13.

In this embodiment, the sleeve 23 further has in the region of its inner portion 25, an annular groove 27 whose axial depth is less than the length of the inner portion 25, as will be seen in FIG. 4.

In this manner, it will be seen that the relatively thin wall 28 of the sleeve 23, which maintains contact with the tube guide 13 above the ribs 26, may be easily deformed during a clutch release operation to allow self-alignment of the release bearing, said wall 28 being forced into the annular groove 27. Since the axial depth of the groove 27 is less than the length of the portion 25, it will be seen that there is a solid annular portion 29 in the resilient sleeve 23 which works to effect compression during the clutch release operation. Thus, the functioning in this embodiment is substantially, analogous to that of the resilient sleeve shown in FIGS. 1 and 2, the ribs 26 being deformed in the same manner. The flexibility of the device is, however, increased due to the presence of the annular groove 27 which lies outside the ribs 26.

The embodiment of FIG. 6 is a variation of the construction of the resilient sleeve of FIGS. 4 and 5 hereinabove. As will be seen in FIG. 6, the resilient sleeve 30 also comprises an inner portion 31 free of ribs and which does not come into contact with the tube guide 13 and an inner portion 32 equipped with a plurality of ribs 33 of a structure and form analogous in all respects to the previous ones. An annular groove 34 is also disposed in the portion 32 outside the ribs 33. However, in this embodiment the axial depth of the annular groove 34 is greater than the total length of the inner portion 32 or, which amounts to the same thing, of the ribs 33. In this manner, the zone 35 of the resilient sleeve 30 which is located near the inner end of the annular groove 34 is an annular zone working to effect flexing when the sleeve is being deformed during a clutch disengagement operation.

FIGS. 7 and 8 illustrate another embodiment of a resilient sleeve used in a clutch release bearing in accordance with the present invention. The resilient sleeve 36 comprises an inner portion 37 free from ribs and not coming into contact with the tube guide 13, and an inner portion 38 equipped with a plurality of teeth or ribs 39 of a structure and shape identical in all details to the preceding ones and their narrowed ends come into contact with the outer surface of the tube guide 13, as may be seen in FIG. 8.

In this embodiment, the sleeve 36 comprises in its inner portion 38, and in the area of each of the ribs 36, a blind recess 40 located concentrically relative to the ribs, each recess lying substantially in a plane parallel to the axis of the release bearing. As may be seen in FIG. 8, there thus are as many blind recesses 40 as there are ribs 39, so that the inner wall 41 of each blind recess 40 may be deformed during a clutch-release operation at the same time as the corresponding rib 39.

In the embodiment illustrated in FIG. 7, the blind recesses 40 have been shown to be of lesser axial depth than the total length of the inner portion 38 and of the ribs 39, so that the resilient sleeve 36 has a solid annular zone 42 working to effect compression, as in the embodiment shown in FIG. 4. It will be well understood that blind recesses of a greater axial depth may be provided so as to create an annular zone working to effect flexing and being substantially identical to that provided in the embodiment shown in FIG. 6.

FIG. 9 illustrates an embodiment of a resilient sleeve which is symmetrical in relation to a radial plane. The resilient sleeve 43 has, in effect, in the same way as the resilient sleeve 19 of FIG. 3, a central cylindrical recess 44 which does not enter into contact with the outer surface of the tube guide 13. On each side of this central recess 44 free of ribs in contact with the tube guide, the sleeve 43 has ribs 45 and 46 and a structure and shape identical to the preceding ones. In the area of each of these rib units, the sleeve 43 has an annular groove 47, 48 which plays the same role as the annular groove 27 or 34 of the embodiments shown in FIGS. 4 and 6.

Here also, it will be understood that it is possible to replace said annular grooves 47 and 48 by a plurality of blind recesses in the area of each of the ribs 45 or 46 so as to obtain deformation analogous to that of the embodiment shown in FIG. 8. The depth of each of these recesses or of each of said annular grooves may also be selected in this instance so as to obtain a compression zone or a flexing or bending zone depending on the flexibility that it is desired to impart to the clutch release bearing.

FIG. 10 illustrates, with the aid of a section along a plane perpendicular to the axis of the bearing of a resilient sleeve, an embodiment in which the number of ribs in contact with the tube guide 13 is low. As an illustrative example, a resilient sleeve 49 has been chosen which comprises only three axial ribs 50, 51, and 52 in contact with the tube guide 13 shown in broken lines. The ribs 50, 51, or 52, or active ribs, have a structure and shape identical to those of the ribs previously described. They, therefore, have a shape that narrows toward the inside and are all inclined in the same direction so as to favor their deformation by bending during a clutch release operation. FIG. 10 shows in thin outline the relative position occupied by the tube guide 13 during maximal deformation of the two ribs 50 and 51. It is understood that in reality the tube guide is stationary, and it is the sleeve and the bearing which move in relation to it. As may be seen, in this extreme position the tube guide 13 may enter into contact with a supplementary rib 53 acting as a safety bearing. To this end, the rib 53 which is disposed substantially at equal distance between the active ribs 50 and 51 has a relative large inner surface so as to come into contact with the outer surface of the tube guide 13 without becoming deformed. In this manner when the clutch disengagement operation is ended, the tube guide 13 does not run the risk of remaining jammed between the two deformed active ribs 50 and 51 and the bearing returned into its centered position. Other supplementary ribs acting as bearings and indicated by reference numerals 54 and 55 are also provided, so that one of these ribs acting as a bearing should always be located between two active ribs.

With the present invention, an inexpensive clutch release bearing is obtained because of the use of a ball bearing comprising inner and outer thin-walled rings and elimination of any intermediate sliding socket.

Further, the particular structure of the resilient sleeve and of its ribs in accordance with the invention makes it possible to obtain a resilient self-aligning which reduces considerably the wear and tear of the members which are in contact during each clutch release operation.

Figure 11:
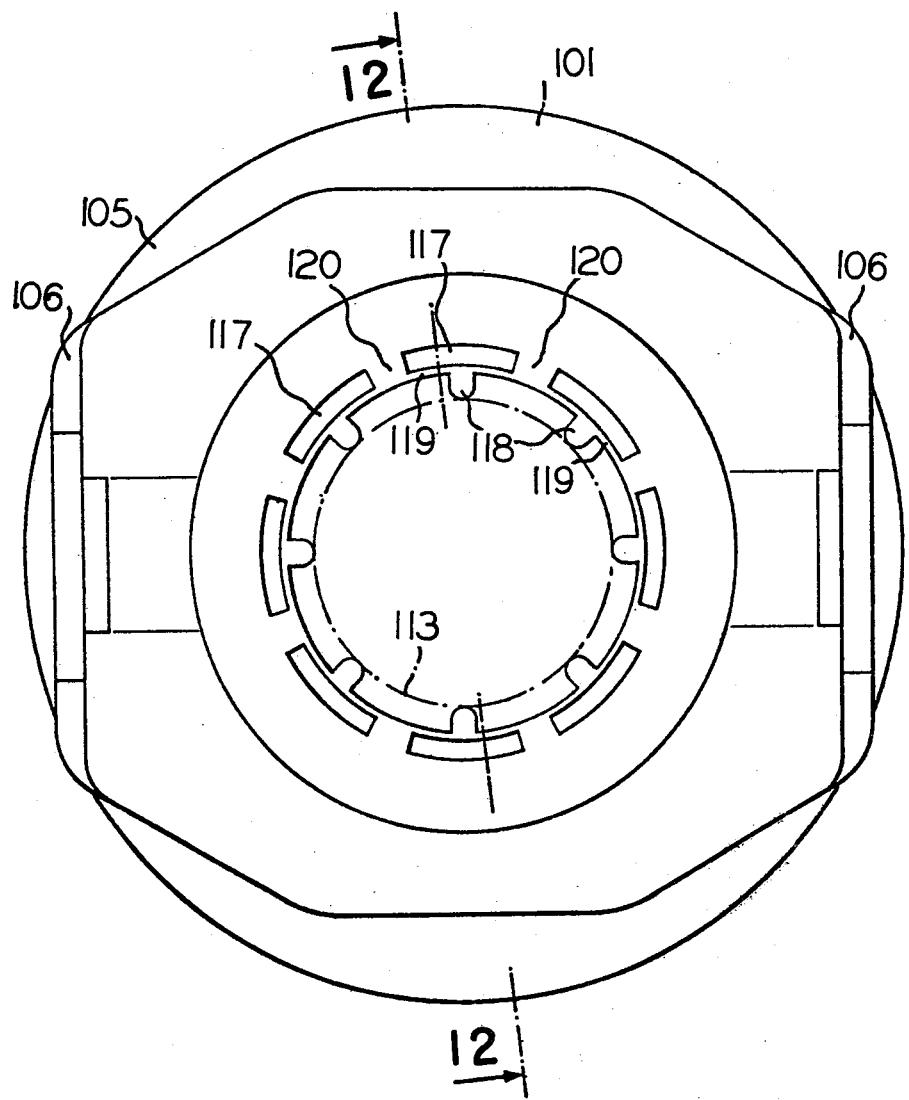
FIG. 11 is an end view of a first embodiment of a self-aligning clutch release bearing in accordance with the present invention.
Figure 12:
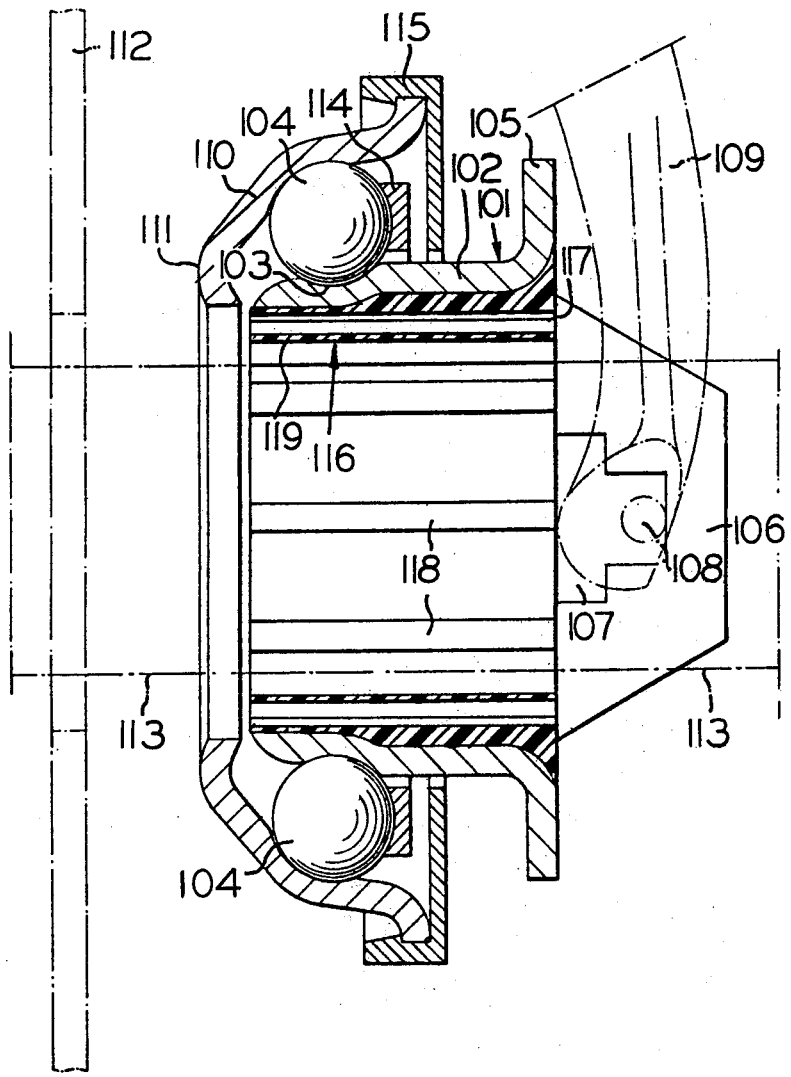
FIG. 12 is a view in section along the line 12—12 of FIG. 11.

The clutch release bearing illustrated in FIGS. 11 and 12 comprises a thin-walled interior rolling ring or inner race 101 in accordance with the invention formed by shaping from a metal sheet or tube having a tubular portion 102 and a toric rolling path or ball raceway 103 for a row of balls 104. In this embodiment, the tubular portion 102 is exteriorly prolonged by a radial collar 105 which, in turn, is laterally prolonged by two lugs 106 parallel to the axis of the release bearing. Each lug 106 has a recess 107 which cooperates with a locking pin 108 of the control fork 109, these elements being shown in broken lines in FIG. 12. It will, of course, be well understood that other means for securing the fork 109 may be contemplated.

The ball bearing of the clutch release bearing is completed by an exterior ring or outer race 110, also having a thin wall formed by shaping from a metal sheet or a tube. The outer race 110 comprises a toric portion 111 which may come into contact with the surface of a diaphragm 112 (shown in broken lines in FIG. 12) when the clutch fork 109 has induced movement of the release bearing in relation to a tube guide 113 (shown in broken lines in FIG. 12) and inside which the shaft of the gear box revolves. The balls 104 are held by a cage 114, the bearing being protected by a cover 115.

In accordance with the invention, a sleeve of resilient material 116 is secured by any appropriate means, for example by molding, on the inner surface of the inner race 101, thus covering the latter over its entire width. The resilient sleeve 116 has in its thickness a plurality of recesses 117, which in the illustrated example are eight in number, as will be seen in FIG. 11. The recesses 117 are directed substantially parallel to the axis of the release bearing and extend over the entire length of the sleeve 116, which they traverse from one end to the other. In the area of each of the recesses 117 the inner surface of the resilient sleeve 116 has an inner rib 118 which projects inwardly in a substantially radial direction and is oriented parallel to the axis of the release bearing. As may be seen in FIG. 12, the ribs 118 extend over the entire length of the resilient sleeve 116 and enter into contact with the outer surface of the tube guide 113. The shape of the ribs 118 is not critical, and their function is merely to transmit the compression stress, during each clutch disengagement operation, to the inner wall 119 of each of the recesses 117, so that the wall 119 may be deformed out toward the interior of the recess 117 and thus cause a certain radial movement of the release bearing in relation to the tube guide 113 and, at the same time, a certain pivoting movement insuring the self-alignment of the release bearing. In FIG. 11, the ribs 118 have been shown with a substantially semicircular shape in contact with the tube guide 113. It will be understood that a different shape may perfectly well be used for the same purpose.

In FIG. 11, eight recesses 117 and eight ribs 118 are shown. This number, taking into account their respective dimensions, preserves between each recess 117 a solid portion 120 narrower than is each recess 117. It will be understood that one could perfectly well choose a different number of recesses 117 as well as different relative dimensions, depending on the nature of the material used for the resilient sleeve 116 and on the rigidity desired for the clutch release bearing. However, it is advisable not to use too small a number of ribs 118, so as to avoid any jamming of the tube guide 113 when the release bearing is in clutch-disengaging position.

During a clutch disengagement operation controlled by the clutch pedal of the vehicle, the clutch fork 109 induces pressure on the inner race 101 of the ball bearing or other bearing used in the invention. The latter then slides on the tube guide 113, this sliding movement occurring through the intermediary action of the ribs 118 of the resilient sleeve 116, which is in frictional contact with the outer surface of the tube guide 113. When the stress is transmitted by the toric portion 111 of the outer race 110, in contact with the diaphragm 112, the ribs 118 induce deformation of the walls 119 of the recesses 117, thus insuring correct automatic alignment of the axis of the clutch release bearing in relation to the axis of the diaphragm 112.

FIGS. 13 to 17 are much more schematic representations than are FIGS. 11 and 12; they show different embodiments of the resilient sleeve which is interposed, in accordance with the present invention, between the inner race 101 of the bearing and the tube guide 113. For simplification, only half of the sleeve has been shown, and its shape has been stylized, preserving only its essential characteristics. It will, however, be understood that in reality the general form of these sleeves of resilient material will be somewhat different and will in particular be adapted to the inner surface of the inner race 101 of the bearing so as to permit affixing, for example, by molding.

Figure 13:
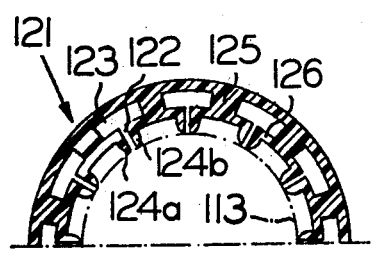
FIG. 13 is a schematic view in section showing the upper half of a sleeve made of resilient material in accordance with another embodiment of the invention.

FIG. 13 shows in frontal section a resilient sleeve 121 which is a modification of the sleeve 116 of the preceding figures. As shown in FIG. 13, the radial ribs in contact with the outer surface of the tube guide 113 are split over their entire length by an axial groove 122 which extends from the outer surface of the tube guide 113 out into the corresponding recess 123. As a result, the substantially axial recesses 123 are no longer closed, as are the recesses 117 of the preceding figures, but are open toward the interior through the groove 122. The ribs in contact with the tube guide 113 are thus, in effect, separated into two independent ribs 124a and 124b. Each rib 124a and 124b is connected to a solid portion 125 of the sleeve 121 through the intermediary action of a flexible wall 126, which can become deformed when the release bearing moves in relation to the tube guide 113.

It will thus be understood that such an embodiment functions, in effect, substantially analogously to that of the preceding figures, even though the presence of the groove 122 which separates the radial ribs in contact with the tube guide 113 into two symmetrical portions 124a and 125b increases the flexibility of the unit.

Figure 14:
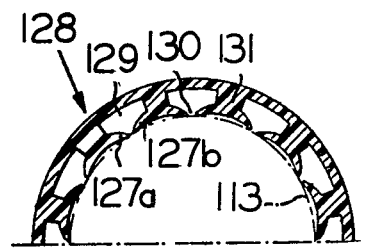
FIG. 14 is a view like FIG. 13 showing a further embodiment of the resilient sleeve.

FIG. 14 shows a modification of the embodiment of the resilient sleeve of FIG. 13 which practically does not differ from the latter except for the configuration of the ribs 127a and 127b in contact with the outer surface of the tube guide 113. In this embodiment, the resilient sleeve 128 also has axial recesses 129 which are open toward the interior through the intermediary action of a slit 130. The inner walls of the recesses 129 thus cut into two parts are curved toward the interior so as to form the ribs 127a and 127b which are in the form of inclined tongues whose free ends are in contact with the tube guide 113 and are apt to be deformed by bending or flexing during a clutch disengagement operation.

In all preceding embodiments, it has been stated that the substantially axial recesses extended over the entire length of the resilient sleeve from one end to the other. Further, in the preceding embodiements, the ribs extended over the entire length of the resilient sleeve, the same as the recesses.

Figure 15:
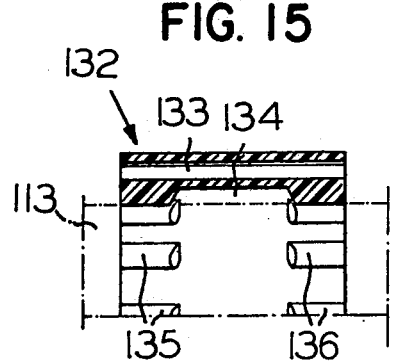
FIG. 15 is a view partially in section of the upper half of a sleeve made of resilient material and of symmetrical configuration, in accordance with the invention.
Figure 16:
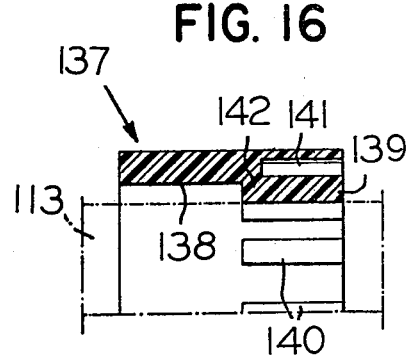
FIG. 16 is a view like FIG. 15 illustrating a non-symmetrical configuration, also comprising blind recesses.
Figure 17:
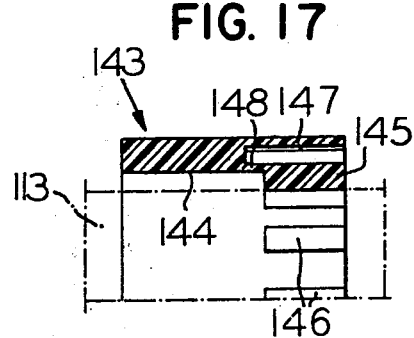
FIG. 17 is a schematic view illustrating a modified form of the sleeve of FIG. 16.

The object of the next following FIGS. 15-17 is to illustrate the possibility of providing blind recesses extending over a portion of the length of the sleeve and partial ribs.

FIG. 15 shows in section in schematic elevation a resilient sleeve 132 having recesses 133 which extend over the entire length of the sleeve 132 and pass through it. The inner surface of the sleeve 132 has a central portion 134 free of ribs and occupying slightly more than one-third of the total length of the sleeve. The inner diameter of the portion 134 is greater than the outer diameter of the tube guide 113, so that the portion 134 does not come into contact with the tube guide 113. On each side of the said central portion 134, the sleeve 132 has a plurality of ribs 135 and 136, whose structure and disposition are identical to those of the preceding embodiments. It is thus possible to use ribs which work solely by compression, as in the embodiments of FIGS. 11 and 12, or ribs which can be deformed by flexing, as shown in FIG. 14. It is well understood that each of the ribs 135 and 136 is disposed substantially in the region of a recess 133.

FIG. 16 is a modification of the construction of FIG. 15, illustrating a resilient sleeve 137 having an inner cylindrical lateral portion 138 shorter than the total length of the sleeve and free of ribs, having an inner diameter greater than the outer diameter of the tube guide 113, with which it does not come into contact. The sleeve 137 has another inner portion 139 provided with substantially radial ribs 140 coming into contact with the tube guide 113 and having a structure analogous to that of the previously described ribs in connection to the preceding embodiments. The inner portion 139 has substantially axially-extending blind recesses 141 located in the area of each of the ribs 140, so that their inner wall can become deformed under the action of a compression stress transmitted by the ribs 140 during each clutch-disengaging operation. As will be seen in FIG. 16, the blind recesses 141 have a depth shorter than the length of the inner portion 139, so that there is preserved, above the ribs 140 in contact with the tube guide 113, a solid annular zone 142 working to effect compression during the clutch-disengaging operation.

The embodiment of FIG. 17 is a modification of the construction of the resilient sleeve of FIG. 16. As shown in FIG. 17, the resilient sleeve 143 also has cylindrical inner portion 144 not coming into contact with the tube guide 113, and an inner portion 145 provided with ribs 146 coming into contact with the tube guide 113 and of a structure analogous in all points to the preceding ones. The blind recesses 147 disposed in the area of each of the ribs 146 have, contrary to the embodiment of FIG. 16, a depth greater than the total length of the ribs 146. In this manner, the zone 148 of the resilient sleeve 143 which is located in the area of the bottom of the blind recesses 147 is an annular zone working to effect bending during deformation of the sleeve in the course of the clutch-disengaging operation.

It will be understood that in the symmetrical embodiment shown in FIG. 15 where the resilient sleeve has a central zone which does not come into contact with the tube guide 113, it is possible to apply the teaching shown in FIGS. 16 and 17 by providing a plurality of blind recesses which replace the plurality of recesses 133 extending from end to end of the resilient sleeve 132.

The present invention thus provides a clutch release bearing which is inexpensive, taking into account the use of a ball bearing having inner and outer races with thin walls and further taking into account the elimination of any intermediate sliding socket. Further, the particular structure of the resilient sleeve in accordance with the invention makes it possible to obtain resilient self-alignment, thus considerably decreasing the wear and tear on the members in contact during each clutch-disengaging operation.

Figure 18:
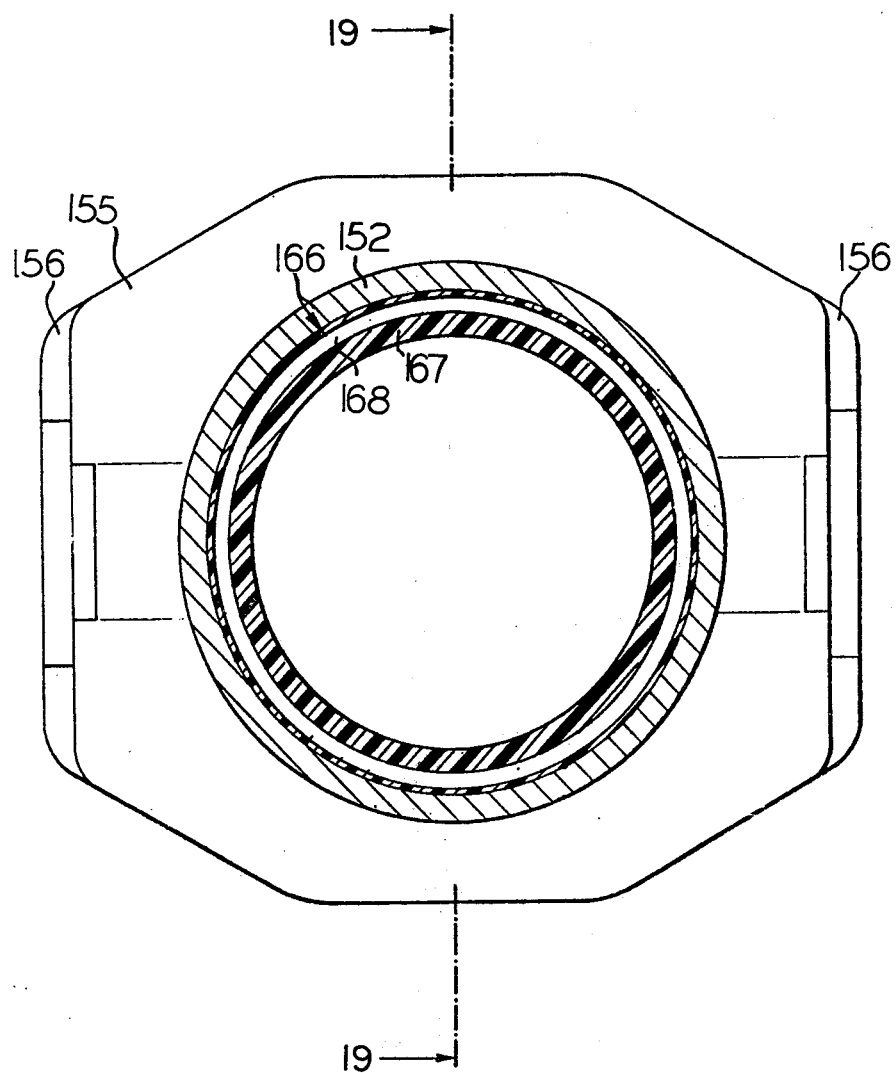
FIG. 18 is a sectional view along the line 18—18 of FIG. 19, executed in a plane perpendicular to the axis of a self-aligning clutch release bearing in accordance with the invention.
Figure 19:
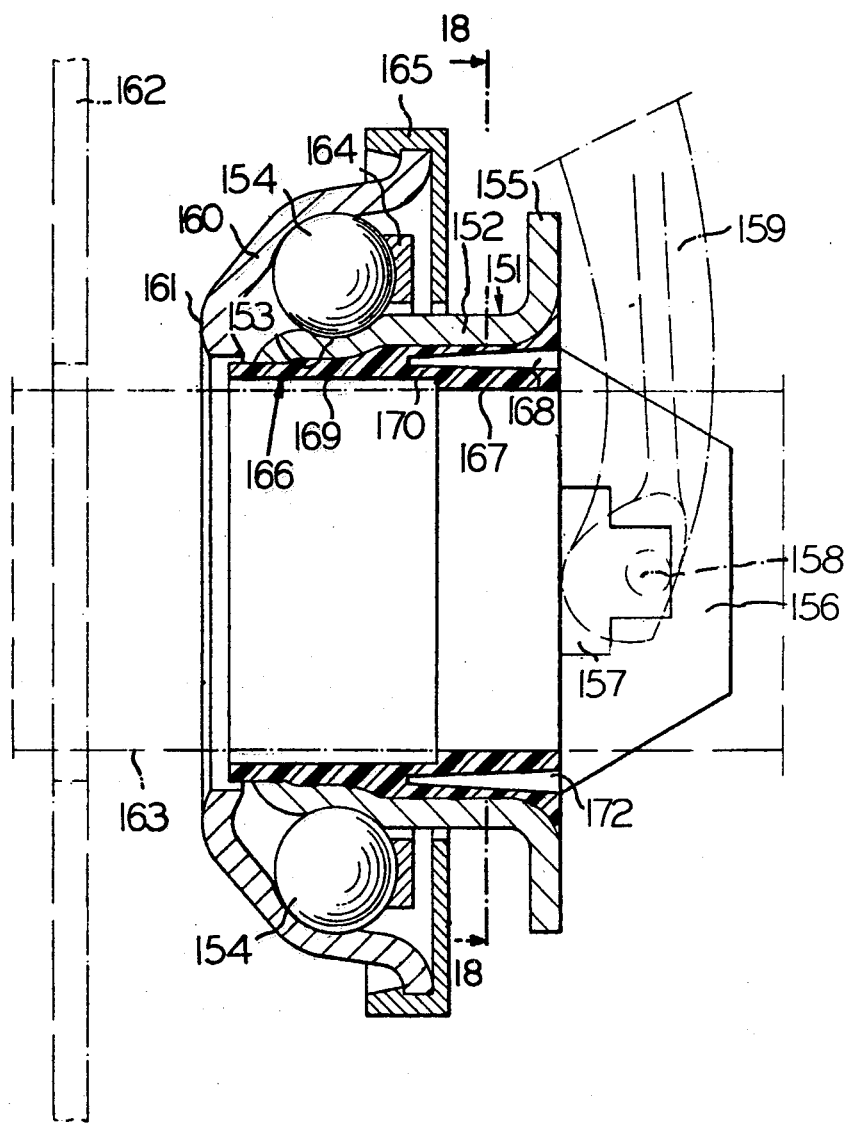
FIG. 19 is a sectional view in elevation along the line 19—19 of FIG. 18 of the same self-aligning clutch release bearing.

As shown in FIGS. 18 and 19, the clutch release bearing comprises an inner thin-walled race 151, as may be made by stamping from a metal sheet or tube, having a tubular portion 152 and a toric raceway 153 for a row of balls 154. Again, roller or needle or other anti-friction bearings could be used. In this embodiment, the tubular portion 152 is prolonged outwardly by a radial flange 155 which in turn is laterally prolonged by two lugs 156 parallel to the axis of the release bearing and each having a recess 157 cooperating with a locking pin 158 of a clutch control fork 159, these elements being shown in broken lines in FIG. 19. It will be well understood that other securing means for the fork may be contemplated.

The ball bearing of this clutch release bearing is completed by an outer race 160 also having thin walls, as may be made by stamping from a metal sheet or tube. The outer race 160 comprises a toric portion 161 which can come into contact with the surface of the diaphragm 162 shown in broken lines in FIG. 19 which the fork 159 has induced longitudinal movement of the release bearing in relation to a tube guide 163 shown in broken lines in FIG. 19 and inside which the shaft of the gear box rotates. The balls are held by a cage 164, the bearing being protected by a cover 165.

In accordance with the invention, a sleeve of resilient material 166 having an inner cylindrical portion 167 of a length less than the total length of the sleeve and coming into contact over the entire inner cylindrical surface with the outer surface of the tube guide 163 is secured by any appropriate means, for example molding, on the inner surface of the inner race 152. An annular groove 168 extends in the thickness of the sleeve 166 in the area of the inner portion 167. As may be seen in FIG. 19, the sleeve 166 comprises another cylindrical inner portion 169 whose inner diameter is greater than the outer diameter of the tube guide 163, in such a manner that the inner portion 169 does not come into contact with the tube guide 163. In the embodiment shown in FIG. 19, it is seen that the depth of the annular groove 168 is greater than the total length of the inner portion 167 in contact with the tube guide 163. The sleeve 166 thus includes an annular portion 170 which does not come into contact with the tube guide 163 and which is located in the area of the bottom of the annular groove 168. The groove or recess 168 is tapered so that it gets smaller as one moves from its outer open end to its bottom.

During the clutch disengagement operation controlled by the clutch pedal of the vehicle, the clutch fork 169 induces pressure on the inner race 151 of the ball bearing or other bearing used in the invention. It then slides on the tube guide 163, this sliding movement occurring directly through the intermediary of the inner cylindrical portion 167 of the resilient sleeve 166. When the stress is transmitted to the toric portion 161 of the outer race 160 in contact with the diaphragm 162, the inner portion 167 and the annular zone 170 are deformed by flexing outwardly into the interior of the annular groove 168, thus insuring correct automatic alignment of the axis of the clutch release bearing in relation to the axis of the diaphragm 162.

FIGS. 20 to 25 are much more schematic representations than FIGS. 18 and 19, being for the purpose of showing different embodiments of the resilient sleeve which is interposed in accordance with the present invention between the inner race of the bearing and the tube guide. For simplification, only half of the sleeve has been shown, and its shape has been stylized while retaining only its essential characteristics. It will, however, be understood that in reality the general shape of these sleeves of resilient material will be somewhat different and will in particular be adapted to the inner surface of the inner race of the bearing so as to permit affixing, for example, by molding.

Figure 20:
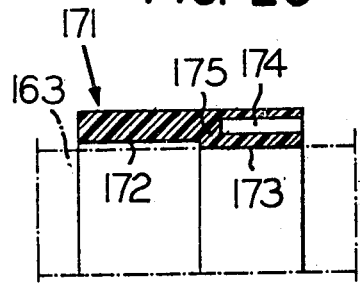
FIG. 20 is a schematic view in elevation in partial section showing a sleeve of resilient material according to a modification of the invention.

FIG. 20 shows in partial section in elevation a resilient sleeve 171 of substantially the same configuration as the resilient sleeve 166 of the clutch release bearing shown in FIGS. 18 and 19. One again finds, in effect, an inner cylindrical portion 172 whose inner diameter is such that it does not come into contact with the outer surface of the tube guide 163, as well as a cylindrical inner portion of a length less than the total length of the sleeve and coming into contact with the tube guide 163. One also finds again an annular groove 174. It should be noted that in FIG. 20 the annular groove 174 is of rectangular shape; the annular groove has, in fact, been shown in this simple geometric form in order to simplify the figure; it may be tapered as shown in FIG. 19, and such an annular groove usually comprises clearances enabling molding and removal from a mold of the resilient sleeve 170; such clearances may be found in FIG. 19.

However, in relation to the resilient sleeve 166, the sleeve 171 has the important difference that the depth of the annular groove 174 is less than the total length of the inner portion 173 coming into contact with the tube guide 163. In this way, the sleeve 171 has a solid annular portion 175 which is located opposite the end of the inner portion 173 in contact with the tube guide 163 and which works to effect compression during a clutch disengagement operation.

Figure 21:
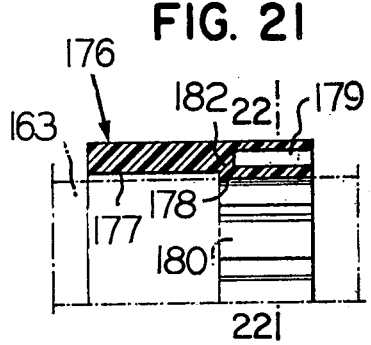
FIG. 21 is a view analogous to FIG. 20 but illustrating a modification in the structure of the sleeve.
Figure 22:
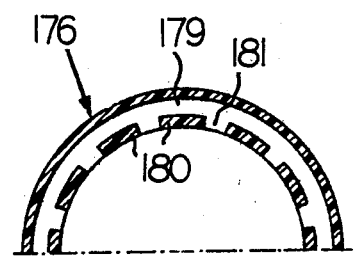
FIG. 22 is a partial section along the line 22—22 of FIG. 21.

FIGS. 21 and 22 show, respectively, in sectional elevation and in frontal section, a resilient sleeve 176 comprising an inner cylindrical portion which does not come into contact with the outer surface of the tube guide 172 as well as an inner portion 178 in contact with the tube guide, in the area of which an annular groove 179 is disposed in the thickness of the sleeve 176. In this embodiment, the inner portion 178 of the resilient sleeve is cut or otherwise divided so as to form a plurality of strips 180 separated by spaces 181. As shown in FIG. 21, the strips 180 are substantially axial and can penetrate into the interior of the annular groove 179 during a clutch disengagement operation.

It will be well understood that in this embodiment, it is possible to modify the depth of the annular groove 179 so as to replace the compression zone 182 by a flexing zone, as in the embodiment of FIG. 19.

Figure 23:
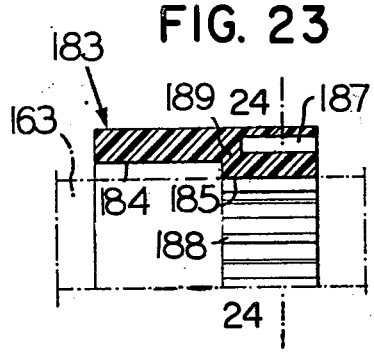
FIG. 23 is a view analogous to FIGS. 20 and 21 showing another modification in the structure of the sleeve.
Figure 24:
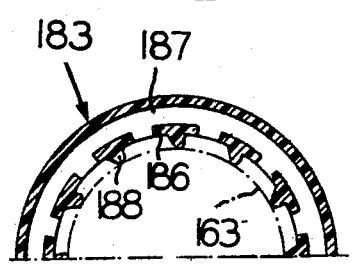
FIG. 24 is a partial section along the line 24—24 of FIG. 23.

FIGS. 23 and 24 show a modification of the resilient sleeve of FIGS. 21 and 22. In this modification, the resilient sleeve 183 also has a portion 184 which does not come into contact with the tube guide 163, and a portion 185 cut or otherwise divided into a plurality of substantially axial strips 186 in the area of which an annular groove 187 is disposed in the thickness of the resilient sleeve 183. In this embodiment, the strips 186 each has an inner groove 188 projecting radially and oriented parallel to the axis of the release bearing, the contact between the resilient sleeve 183 and the tube guide 163 being established through the intermediary of said inner grooves 188.

The shape of the grooves 188 may be chosen so as to work in compression and to transmit the stress simply from the tube guide 163 to the strips 186 which become deformed while penetrating into the annular groove 187. In the embodiment shown in these figures, the grooves 188, however, have a somewhat particular shape, narrowing toward the interior, the grooves further being inclined in relation to the radial direction. In this way, supplementary deformation of the grooves 188 proper is obtained which are likely to flex during a clutch disengagement operation, thus increasing the flexibility of the unit.

In the embodiment described in FIGS. 23 and 24, the annular groove 187 has a depth which is less than the total length of the grooves 188, so that the sleeve comprises an annular compression zone 189. It will be understood that the depth of the annular groove 187 may be modified so as to transform this compression zone into a flexing zone.

Figure 25:
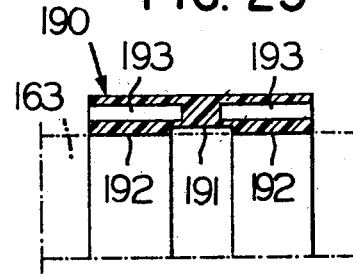
FIG. 25 is a section in partial elevation showing a modification of the sleeve of resilient material in accordance with the invention.

The embodiment of FIG. 25 illustrates a resilient sleeve structure which is symmetrical in relation to a plane perpendicular to the axis of the release bearing. A resilient sleeve 190, as shown, has an inner portion 191 which does not come into contact with the tube guide 163 and on each side two lateral symmetrical portions 192, the cylindrical inner portion of which comes into contact with the outer surface of the tube guide 163. In the area of each of the cylindrical portions 192, an annular groove 193 is disposed whose depth is greater than the total length of the portions 192.

It goes without saying that all resilient sleeves shown may be of symmetrical configuration like that of FIG. 25. Other modifications analogous to FIG. 25 could therefore have been equally shown and may include, for example, axial strips, if desired, provided with grooves like the sleeves such as those illustrated in FIGS. 20 to 24.

It should be noted that the choice of the number of strips of these modifications, if desired provided with grooves, as well as the choice of the depth of the annular groove in relation to the surface in contact with the tube guide are at least partly determined by the rigidity of the material employed for the resilient sleeve and, on the other hand, by the flexibility that it is desired to impart to the clutch release bearing.

The present invention provides an inexpensive clutch release bearing, taking into account the use of a ball bearing comprising inner and outer thin-walled races and elimination of any intermediate sliding socket.

Further, the particular structure of the resilient sleeve which may be obtained by molding and affixed by molding onto the inner race of the bearing, provides a resilient self-alignment which considerably reduces wear and tear of the members which are in contact during each clutch disengagement operation.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A self-aligning resilient clutch release bearing assembly encircling a tube guide having a cylindrical outer surface and in between a diaphragm and a control element, comprising
   thin-walled inner and outer races,
   a plurality of rolling elements in between and bearing on said races,
   the outer race having a portion for contact with said diaphragm,
   the inner race having means for engagement with said control element, the inner race having an axially extending, generally cylindrical portion with a radially outer surface engaging said rolling elements and an inner surface, and
   a sleeve of resilient material secured to said inner surface and covering substantially the entire length thereof, said sleeve having along at least a portion of its inner surface a series of radially inwardly-extending ribs running parallel to the axis of the release bearing and each extending in at the same angle relative to the sleeve and in slidable direct contact with the cylindrical outer surface of said tube guide,
   the shape of the ribs each narrowing from the outside in so as to enable deformation of said ribs when said ribs slide along said guide tube during each clutch disengagement operation, both by compression deformation in substantially the radial direction and by flexing deformation in substantially the tangential direction.

2. A clutch release bearing assembly in accordance with claim 1 wherein said ribs are all inclined in the same direction in relation to the radial direction so as to increase the flexibility of said ribs.

3. A clutch release bearing assembly in accordance with claim 2 wherein said ribs are inclined in the direction of rotation of the release bearing.

4. A clutch release bearing assembly in accordance with claim 1 wherein said sleeve has its said ribs along two portions thereof, said portions being separated by a central part constituting a rib-free cylindrical recess occupying at least one-third of the total length of said sleeve.

5. The clutch release bearing assembly according to claim 4 wherein hold means is provided in said sleeve lying radially outwardly from said ribbed portions for facilitating the deformation of said ribs during each clutch disengagement operation.

6. The clutch release bearing assembly according to claim 5 wherein said hole means comprises an axial annular groove.

7. The clutch release bearing assembly according to claim 5 wherein said hole means comprises a series of through openings each radially aligned with a said rib and extending axially through said sleeve.

8. A clutch release bearing assembly in accordance with claim 1 wherein said sleeve has its said ribs extending axially from one end succeeded by a rib-free cylindrical inner portion at its other end of an internal diameter which is greater than the external diameter of the tube guide, and axial hole means in the ribbed portion of said sleeve lying radially outwardly from and generally aligned with said ribs, for facilitating the deformation of said ribs during each clutch disengagement operation.

9. A clutch release bearing assembly according to claim 8 wherein said hole means comprises an annular axial groove.

10. A release bearing in accordance with claim 8 wherein said ribs are shorter in axial length than said hole means.

11. A release bearing in accordance with claim 8 wherein said ribs are longer in axial length than said hole means.

12. A release bearing in accordance with claim 8 wherein said hole means comprise a plurality of substantially axial blind recesses being provided in said sleeve, each of said recesses being radially outward from and generally aligned with said ribs.

13. A release bearing in accordance with claim 12 wherein said blind recesses are axially shorter than said ribs, so as to maintain an annular zone working to effect compression.

14. A release bearing in accordance with claim 12 wherein the axial depth of said blind recesses is greater than the length of said ribs, so as to maintain a zone susceptible to bending.

15. A release bearing in accordance with claim 1 wherein there are at least six said ribs in number.

16. A release bearing in accordance with claim 15 wherein there are twenty-four said ribs.

17. A release bearing in accordance with claim 1 wherein there are at least three said ribs and no more than six and wherein there are supplementary ribs playing the role of bearings and not normally entering into contact with the tube guide, said supplementary ribs being interposed between the active ribs that are in contact with the tube guide.

18. A self-aligning resilient clutch release bearing assembly encircling a tube guide having a cylindrical outer surface and in between a diaphragm and a control element, comprising:
   thin-walled inner and outer rings,
   a plurality of rolling elements in between and bearing on said rings,
   the outer ring having a portion for contact with said diaphragm,
   the inner ring having means for engagement with said control element, the inner ring having an axially extending, generally cylindrical portion with a radially outer surface engaging said rolling elements and an inner surface, and
   a sleeve of resilient material secured to said inner surface and covering substantially the entire length thereof, said sleeve having along at least a portion of its inner surface a series of radially inwardly-extending flexible ribs running parallel to the axis of the release bearing in slidable direct contact with the cylindrical outer surface of said tube guide, and each extending in at the same angle relative to the sleeve and having means for enabling deformation of said ribs during each clutch disengagement operation by flexing.

19. A release bearing in accordance with claim 18 wherein said means for enabling deformation comprises recess means lying radially outwardly from said tube contact means.

20. A release bearing in accordance with claim 19 wherein said recess means and said tube contact means are substantially coextensive axially.

21. A release bearing in accordance with claim 19 wherein said tube contact means extend axially for a distance shorter than said recess means.

22. A release bearing in accordance with claim 19 wherein said tube contact means are axially longer than said recess means.

23. A release bearing in accordance with claim 18 wherein said sleeve has, in its central part, a cylindrical recess free from said tube contact means and occupying at least about one-third of the total length of said sleeve.

24. A release bearing in accordance with claim 18 wherein said flexible portion of said sleeve comprises a cylindrical inner portion shorter than the total length of the sleeve and of an internal diameter which is greater than the external diameter of the tube guide, annular axial groove means being provided in said sleeve lying outwardly from and generally aligned with said tube contact means.

25. A release bearing in accordance with claim 24 wherein said tube contact means is shorter in axial length than said groove means.

26. A release bearing in accordance with claim 24 wherein said tube contact means is longer in axial length than said groove means.

* * * * *